No. 735,963. Patented August 11, 1903.

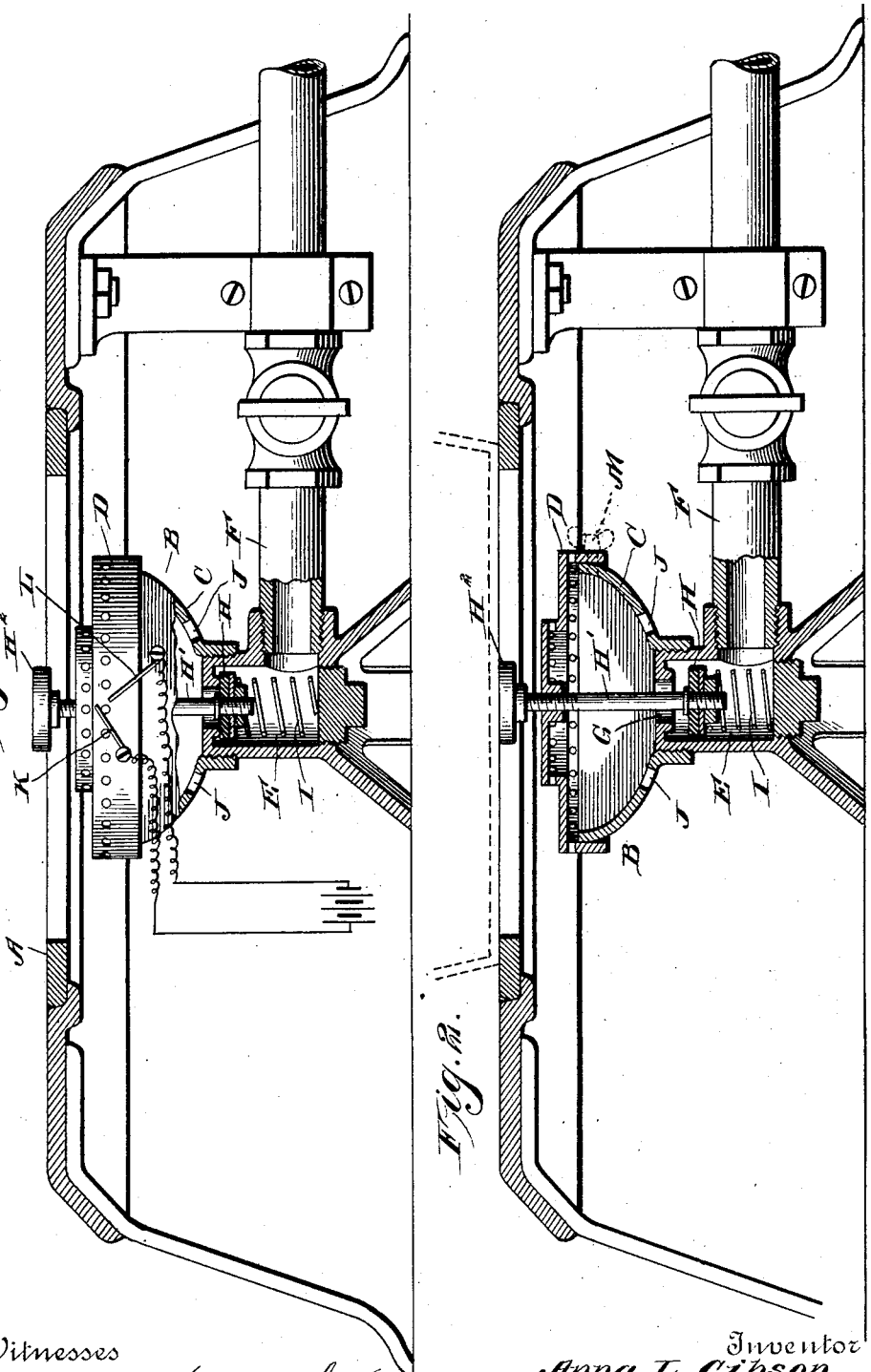

UNITED STATES PATENT OFFICE.

ANNA L. GIBSON, OF PHILADELPHIA, PENNSYLVANIA.

GAS-STOVE.

SPECIFICATION forming part of Letters Patent No. 735,963, dated August 11, 1903.

Application filed July 12, 1902. Serial No. 115,319. (No model.)

*To all whom it may concern:*

Be it known that I, ANNA L. GIBSON, a citizen of the United States, residing at Philadelphia, county of Philadelphia, and State of Pennsylvania, have invented a certain new and useful Improvement in Gas-Stoves, of which the following is a specification.

My invention relates to a new and useful improvement in gas-stoves, and has for its object to provide a gas-stove which shall be so constructed that the gas will only flow and be ignited when a cooking utensil is placed upon the stove.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompaning drawings, forming a part of this specification, in which—

Figure 1 is a sectional view of a gas-stove constructed in accordance with my invention, showing the parts in position when the gas is turned off; Fig. 2, a similar view to Fig. 1, showing the parts in position when a cooking utensil is placed upon a stove.

A represents the top plate of the gas-stove, upon which the cooking utensil is adapted to be supported, and B represents the burner, which consists of a bowl-shaped mixing-chamber C, and D is an annular flanged burner arranged over the mixing-chamber C.

E is a valve-chamber below the mixing-chamber, and in this valve-chamber enters the supply-pipe F. The valve-chamber E is connected with the mixing-chamber by the central opening G.

H is a valve arranged within the valve-chamber E and normally held upon its seat, so as to close the opening G by means of the spring I.

H' is a valve-stem connected with the valve, which extends upward through the mixing-chamber and is secured rigidly to the burner D, so that said burner will be raised or lowered with the valve. Upon the upper end of the valve-stem is formed a button $H^2$, adapted to come in contact with the cooking utensil.

It will now be seen that when the parts are in their normal position the spring I will hold the valve H upon its seat, and thus close any communication between the valve-chamber E and mixing-chamber C; but when a cooking utensil is set upon the stove the weight of said utensil will depress the valve H, which will allow the gas to flow into the mixing-chamber, where it will mix with air coming through the openings J and issue from the burner. It will now be seen that this burner will necessarily have to be automatically lighted at the same time as the gas is turned on, and this I prefer to accomplish electrically, which may be done in any manner desired by bringing together the two contact-points included in electric circuit.

As shown in the drawings, K represents one contact point or spring, secured to and insulated from the outside rim of the annular flange of the burner D. L is another contact point or spring, secured to but insulated from the mixing-chamber C. As the burner D moves with the valve, it is seen that when the parts are in their normal position with the gas turned off the contact-points will be separated; but when a utensil is set upon the stove and the valve and burner depressed the contact-points K and L will pass one another and in passing will generate a spark, and thus ignite the gas.

Of course it is understood that the contact-points are included in an electric circuit, and the source of electricity may be a small battery placed at any convenient point.

When it is desired to utilize this stove as an ordinary gas-stove without the automatic attachment, the burner and the valve may be held down by the insertion of a set-screw M through the depending annular flange of the burner and also through the side of the mixing-chamber C, as illustrated in dotted lines in Fig. 2.

Of course I do not wish to be limited to the exact construction here shown, as slight modifications could be made without departing from the spirit of my invention.

Having thus fully described my invention, what I claim as new and useful is—

1. In a device of the character described, a supply-pipe, a valve-chamber, a mixing-chamber communicating with the valve-chamber, a vertically-movable burner-plate covering the mixing-chamber, a valve-stem threaded and adjustable in the burner-plate, a valve on the lower end of the stem, a button on the upper end of the valve-stem, and a spring holding the valve normally seated, as and for the purpose described.

2. In a device of the character described, a supply-pipe, a valve-chamber, a mixing-chamber communicating with the valve-chamber, a vertically-movable burner-plate covering the mixing-chamber, a valve-stem threaded and adjustable in the burner-plate, a valve on the lower end of the stem, a button on the lower end of the valve-stem, a means for securing the burner in fixed relation to the mixing-chamber, substantially as described.

In testimony whereof I have hereunto affixed my signature in the presence of two subscribing witnesses.

ANNA L. GIBSON.

Witnesses:
H. B. HALLOCK,
L. W. MORRISON.